W. HANLON.
Velocipede.
No. 86,834. Patented Feb. 9, 1869.
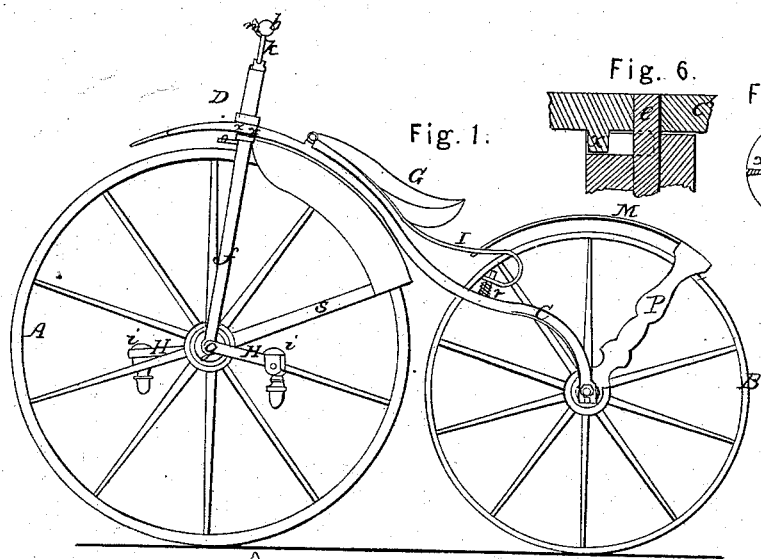
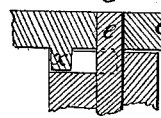
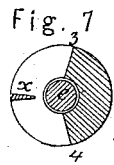
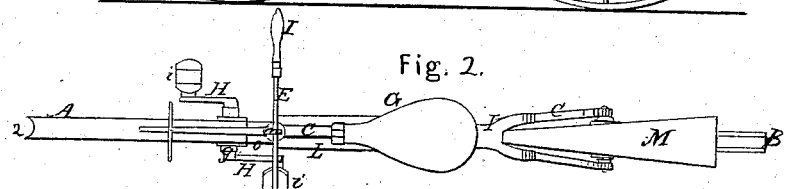
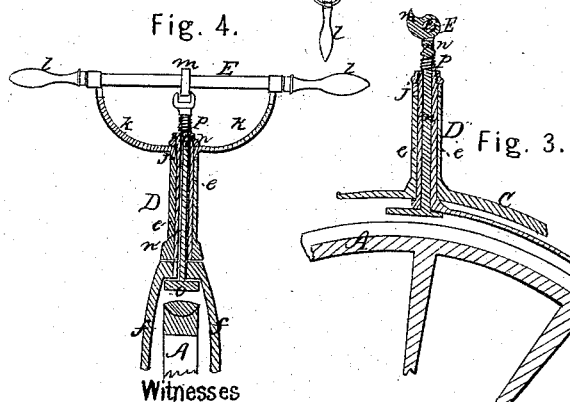
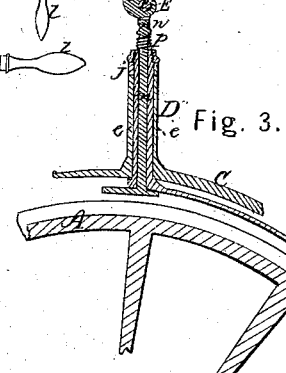
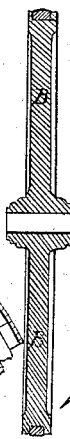
Witnesses
Frederic A. Sayer
Chas. A. Scott
Inventor
Wm. Hanlon
By atty

WILLIAM HANLON, OF NEW YORK, N. Y., ASSIGNOR TO HIMSELF AND GEORGE, ALFRED, EDWARD, AND FREDERICK HANLON, OF SAME PLACE.

Letters Patent No. 86,834, dated February 9, 1869.

IMPROVEMENT IN VELOCIPEDES.

The Schedule referred to in these Letters Patent and making part of the same.

*To all whom it may concern:*

Be it known that I, WILLIAM HANLON, of New York city, of New York county, in the State of New York, have invented certain new and useful "Improved Velocipede;" and I do hereby declare that the following is a full and exact description thereof, reference being had to the accompanying drawings, making part of this application.

Previous to my invention, velocipedes have been made with the driving-cranks attached to the shaft, or axle of the front wheel, and adapted to be operated directly by the feet of the rider, and in propelling the carriage straight ahead, and turning easy curves, no serious difficulty or objection has been encountered. But I have found by experience, that in velocipedes, as heretofore made, it is not possible to turn short or quick curves without bringing the periphery of the front wheel into contact with the clothes of the rider, whereby they are not only soiled by the dirt from the wheel, but, with an expert rider, turning short curves at a high speed, are also soon cut or worn by the friction of the wheel.

This is a great objection, and a growing one, as riders become more expert in the manipulation of the carriage; and to overcome this difficulty is the object of the first part of my present invention, which consists in providing a shield, arranged over a portion of the periphery of the wheel, in such a manner that, while it does not interfere with the motions of said wheel, it will always be interposed between the periphery thereof and the legs of the rider, as will be hereinafter more fully explained.

It has been customary to apply the brake to the hind wheel or wheels of the velocipede, and in that kind having but one rear wheel, it has been most conveniently arranged, by having it placed so as to be operated by the rear end of the saddle or seat, the rider putting on the brake by leaning back in his seat.

I have found, by experience, that it is objectionable to have to change the position of the body, or be obliged to assume a given position, and force the body backward, in order to apply the brake, and that the brake is more efficacious if applied to the driving-wheel; and to overcome the objections just stated, and place the carriage more completely under the control of the rider, are the objects of the second part of my invention, which consists in applying the brake to the forward wheel, and operating it by means of a mechanism controlled by the steering-handles, as will be hereinafter more fully described.

Another and serious objection to the velocipede, as heretofore constructed, has been the liability of the rider having his leg caught between the forward wheel and the perch or frame, in the event of his losing his balance, and tipping over.

The forward wheel, having been in a bifurcated post, which was free to turn entirely around in its bearings, it has sometimes happened that, in turning too short, or by some mistake in the manipulation of the carriage, the rider, losing control of the apparatus, has had his leg caught, and severely injured by the forward wheel turning too far round in one direction, and cramping the limb between its periphery and the perch or frame of the carriage.

The third part of my invention has for its object to prevent the possibility of any such accident to the rider, while, at the same time, the carriage shall possess every capacity for manœuvering which it embodied as heretofore constructed; and to these ends, The third part of my invention consists in providing a means for limiting the rotation or oscillation of the vertical frame, or post in which the front wheel is hung, so that, while the wheel may be turned in either direction, to a sufficient extent to manœuver the carriage as desired, it cannot turn entirely around, so as to catch the leg of the rider, in the event of his falling and carrying the velocipede over.

To enable those skilled in the art to make and use my invention, I will proceed to describe its several characteristic features, referring by letters to the accompanying drawings, in which—

Figure 1 is a side view or elevation of a velocipede embodying my invention;

Figure 2 is a top view of the same;

Figure 3 is a vertical increased scale, showing the brake-mechanism;

Figure 4 is another vertical section, taken in a plane at right angles to that in which section, fig. 3, is drawn, and showing the same parts;

Figure 5 is a detail sectional view, showing the means by which the faces of the wheels are adapted to work on ice; and Figures 6 and 7 are detail views of the stop-motion of the driving-wheel post, by means of which the swivelling-motion of the front wheel is limited, as hereinbefore mentioned.

In the several figures the same parts are indicated by the same letters of reference.

A and B are the front and rear wheels of the carriage, and

C, the perch or main frame, which latter is bifurcated at its rear portion, where is arranged the axle of the rear wheel or wheels, as clearly shown in the drawings, and as described in a former patent granted to me.

Near the forward portion of the perch C there projects upward from it the usual pillar or stand D, within which is arranged, so as to turn freely, the vertical shaft, or stud $e$ of the forked frame in which the front wheel is hung.

This frame is formed about in the usual way, so as to straddle the wheel A, and carry in the lower ends of its arms, $ff$, the axle $g$ of the said wheel, which is made fast in the hub of the latter, and provided, as usual, at each extremity with a driving-crank, H.

These cranks should be provided with stirrup or foot-pieces $ii$, so arranged as to swivel on them, and present good bearing-surfaces for the feet of the rider.

The upper end of the shaft $e$ has fastened to it a collar or hub, $j$, from which branch out, in opposite directions, arms $kk$, and these arms are provided with a bar, E, and handles $ll$, for the purpose of turning or swivelling the front wheel in the usual manner.

The bar E is arranged so as to turn freely in eyes formed in the ends of arms $kk$, and has secured to it a cam, $m$, so constructed and arranged that, by turning said bar in its bearing, the said cam will press down a rod, $n$, which passes down through the hollow stud $e$, and is provided at its lower end with a shoe, $o$, which acts as a brake in the periphery of the wheel A, said rod $n$, and its shoe or brake-block, being thrown and kept up, when relieved from the cam, by means of a spiral spring, $p$.

Immediately over the perch C, in a suitable position, is located the saddle, or seat G, which I have shown attached to an arm, I, hinged at its forward end to the perch, and supported at its rear end on spiral springs $r$; but this seat, or saddle may be secured to a spring-bar, rigidly connected, at its front end only, to the perch, or may be otherwise arranged on the perch, as may be deemed expedient.

L is the shield, which may be made of sheet-metal, covered with cloth, or cushioned in any suitable manner. It is made in the shape of an arc of a circle, about concentric to the periphery of the wheel A, is arranged so as to cover over the latter without touching it, and is attached, at its upper forward end, to the straddle-frame, and its other end to two braces or bars, $ss$, which extend up from the lower ends of arms $ff$, as clearly shown in the drawings.

I propose to provide the rear wheel, in machines having only two wheels, with a shield or protector, M, to keep the dirt thrown from said wheel from the back of the rider.

This shield may be made, as represented, of sheet-metal, with arms P, extending down to the axle, and so as to catch under the rear end of the saddle-arm; or it may be made and arranged in any desirable way, so long as it sufficiently covers a portion of the periphery of the wheel, or is so interposed between it and the rider as to protect his back from the dirt thrown off by the wheel.

As before mentioned, the wheels I propose to make so that the carriage may be run with equal facility on either land or ice.

The peripheries of the wheels may be made somewhat after the fashion of a skate-runner, as seen at Q, and be provided with an annular rubber packing-ring, to fill up the groove when the carriage is to be used on the ground or pavement; or they may be provided with rubber tires, to run on the pavement, and have annular rings, adapted to be bolted in each side of the felloes, and which can be readily removed from the wheel when the carriage is to be used on land.

It will be understood that a great variety of devices may be employed to transform the surface or change the condition of the wheel, so as to adapt it to the different uses on land and ice.

In lieu of having the wheel convertible, or with a changeable tire or face, the velocipede may be furnished to the purchaser by the manufacturer with two sets of wheels, one adapted to be used on ice, and the other on land; but I propose, as a more economic method, to construct one set of wheels, provided with suitable appliances or means, such as described, for converting or changing the face or bearing-surfaces, so as to adapt them to run either on ice or land.

The great advantage of shield or protector, to keep the rapidly-rotating periphery of the forward wheel from coming into contact with the legs or clothes of the rider, will be apparent to every one.

It will be seen that, by the application of the brake to the forward driving-wheel, and the employment of a mechanism for operating it, which is manipulated by the hands of the rider, the brake is rendered more effective, and the carriage is more completely under the control of the rider, since a mere motion of the hands manipulates the brake-mechanism, and he is not obliged to change his position, or assume any particular attitude, while braking up.

The arrangement of devices I have shown and described for operating the brake, it will be seen, is simple and convenient, since, by merely turning the bar in its bearing, the brake is put on, or allowed to release itself; but other arrangements of devices may be employed for carrying out this part of my invention, the gist of which is in the idea of placing the brake under the control of the hands of the rider, and so arranging the mechanism for working it that he is not obliged to change the position of his body, legs, or arms materially.

At figs. 6 and 7, I have illustrated in detail sections, increased scale, the stop-motion, or device for limiting the swing or swivel of the straddle-frame in which the front wheel is hung. The collar-portion is cut away, as shown, and a stop-pin, $x$, projects downward from the lower surface of the pillar or perch in such a manner that, when the swivelling-frame is turned to a certain extent in one direction, the shoulder 3 will come against said stop-pin $x$, and when turned in the opposite direction, the thoulder 4 will come against it.

I have shown these shoulders so formed or located as to permit the wheel to be swivelled a little more than quarter way round before either of them will stop it. Of course the limit may be varied, as deemed expedient, and should be such as to permit the greatest latitude to the rider in manœuvering the carriage, without rendering it possible for the wheel to turn far enough around to catch and hurt his leg, in the event of falling over with the carriage.

The mode of propelling the velocipede by means of the foot-cranks, and the manner of steering it, are of course familiar to those skilled, and need not be explained here.

Having fully described the several features of improvement constituting my invention,

What I claim as new, and desire to secure by Letters Patent, is—

1. Providing the velocipede with a shield, which is interposed between the periphery of the forward wheel and the perch, and secured to the axle by means of braces $ss$, substantially as described.

2. Combining the brake-mechanism with the handles of the velocipede, as and for the purposes described.

3. In combination with the perch and swivelling-frame, means for stopping or limiting the extent of motion of the latter, substantially as and for the purposes set forth.

WM. HANLON. [L. S.]

Witnesses:
 J. N. McINTIRE,
 CHAS. A. SCOTT.